(12) United States Patent
Stephens

(10) Patent No.: US 8,301,621 B2
(45) Date of Patent: Oct. 30, 2012

(54) TOPIC MAP FOR NAVIGATIONAL CONTROL

(75) Inventor: R. Todd Stephens, Sharpsburg, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/557,314

(22) Filed: Nov. 7, 2006

(65) Prior Publication Data

US 2008/0109441 A1    May 8, 2008

(51) Int. Cl.
*G06F 7/00* (2006.01)
*G06F 17/30* (2006.01)
(52) U.S. Cl. ..................... 707/722
(58) Field of Classification Search ............... 707/722, 707/999.01, 999.201, 999.003
See application file for complete search history.

(56) References Cited

U.S. PATENT DOCUMENTS

| | | | |
|---|---|---|---|
| 6,658,423 B1* | 12/2003 | Pugh et al. ......................... 1/1 |
| 2002/0091684 A1* | 7/2002 | Nomiyama et al. .............. 707/3 |
| 2002/0095454 A1* | 7/2002 | Reed et al. .................... 709/201 |
| 2002/0099700 A1* | 7/2002 | Li ..................................... 707/5 |
| 2003/0163784 A1* | 8/2003 | Daniel et al. .................. 715/514 |
| 2004/0220926 A1* | 11/2004 | Lamkin et al. ................... 707/3 |
| 2004/0267815 A1* | 12/2004 | De Mes ..................... 707/104.1 |
| 2005/0234891 A1* | 10/2005 | Walther et al. ................... 707/3 |
| 2005/0246328 A1* | 11/2005 | Zhang et al. ..................... 707/3 |

* cited by examiner

*Primary Examiner* — Aleksandr Kerzhner
(74) *Attorney, Agent, or Firm* — Thomas, Kayden, Horstemeyer & Risley, LLP

(57) ABSTRACT

Included are embodiments for providing a topic map. At least one embodiment of a method includes receiving a plurality of web pages, the web pages including metadata, extracting at least a portion of the metadata from the web pages, and creating at least one topic associated with the web pages, the at least one topic corresponding to at least a portion of the metadata.

19 Claims, 15 Drawing Sheets

560a

| TITLE: | BELLSOUTH – PHONE SERVICE, DIRECTV, CINGULAR WIRELESS, DSL INTERNET |
|---|---|
| KEYWORDS: | BELLSOUTH, PHONE SERVICE, CINGULAR WIRELESS, DIRECTV SERVICE, DSL INTERNET, HIGH SPEED INTERNET |
| DESCRIPTION: | GET LOCAL AND LONG DISTANCE PHONE SERVICE, DSL INTERNET, CINGULAR WIRELESS & DIRECTV SERVICE FROM BELLSOUTH |
| PAGE: | HTTP://WWW.BELLSOUTHISFORME.COM |

A

560b

| TITLE: | LOCAL PHONE SERVICE, CALLING PLANS - BELLSOUTH |
|---|---|
| KEYWORDS: | LOCAL PHONE SERVICE, CALLING PLAN |
| DESCRIPTION: | BELLSOUTH LOCAL PHONE SERVICES AND CALLING PLANS OFFER FLEXIBILITY, RELIABILITY, AND VALUE. AVAILABLE IN ALABAMA, FLORIDA, GEORGIA, KENTUCKY, LOUISIANA, MISSISSIPPI, NORTH CAROLINA, SOUTH CAROLINA, TENNESSEE |
| PAGE: | HTTP://WWW.BELLSOUTHISFORME.COM/CONSUMER/LOCAL... |

TOPIC MAP FOR NAVIGATIONAL CONTROL

CROSS REFERENCE

This application is related to U.S. patent application Ser. No. 11,557,325, entitled "Determining Sort Order by Traffic Volume" and U.S. patent application Ser. No. 11/557,321, entitled "Determining Sort Order by Distance," which are filed on the same day as this application and which are both incorporated by reference in their entireties.

TECHNICAL FIELD

This disclosure relates to a web based topic map. More specifically, this disclosure relates to creating a web based topic map for locating desired information.

BACKGROUND

As the number of web pages on the Internet increases, and the number of pages on web sites increases, problems with website navigation increase exponentially. More specifically, as the number of web pages increases (either on the Internet as a whole, on an Intranet, and/or on a particular website), users may have difficulty locating a web page that is pertinent to the desired information. To combat this problem, websites have emerged that provide searching capabilities. These "search engines" may be configured to provide search options for locating desired data on the Internet. To provide these search options, search engines often utilize search algorithms for locating desired web pages.

Similarly, web pages can be provided with categorical classifications that can be presented in a hierarchical taxonomy to provide a more structured technique for finding a desired web page. A hierarchical taxonomy may include a plurality of predetermined terms from which a user can select. Upon selecting a term, the user may be provided with a plurality of additional second tier terms that relate to the selected term. Selection of a second tier term may reveal a third tier of terms related to the second tier term. This process may continue until the desired information is provided to the user.

While these solutions can aid a user in finding a desired web page, these solutions are not without drawbacks. More specifically, with respect to search engines, oftentimes users are presented with a plurality of web pages without indication of their relationship to the search criteria. The user may not have any concept of the relevancy of the search results and thus may have difficulty finding the desired data. Similarly, a hierarchical taxonomy for search criteria may be difficult for a user to utilize in that a user may not understand the organization of the criteria provided. As such, the user may select an incorrect term for the desired information, thus making location of the desired data and the desired web pages difficult (if not impossible) to locate.

Thus, a heretofore unaddressed need exists in the industry to address the aforementioned deficiencies and inadequacies.

SUMMARY

Included are embodiments for providing a topic map. At least one embodiment of a method includes receiving a plurality of web pages, the web pages including metadata, extracting at least a portion of the metadata from the web pages, and creating at least one topic associated with the web pages, the at least one topic corresponding to at least a portion of the metadata.

Also included are embodiments of a system for providing a topic map. At least one embodiment of a system includes a receiving component configured to receive a plurality of web pages, the web pages including metadata, an extracting component configured to extract at least a portion of the metadata from the web pages, and a creating component configured to create at least one topic associated with the web pages, the at least one topic corresponding to at least a portion of the metadata.

Also included are embodiments of a computer readable medium for providing a topic map. At least one embodiment includes receiving logic configured to receive a plurality of web pages, the web pages including metadata, extracting logic configured to extract at least a portion of the metadata from the web pages, and creating logic configured to create at least one topic associated with the web pages, the at least one topic corresponding to at least a portion of the metadata.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 5A is a block diagram illustrating data that may be associated with a web page, such as a web page provided by the web page server from FIG. 1.

DETAILED DESCRIPTION

Figure 1:
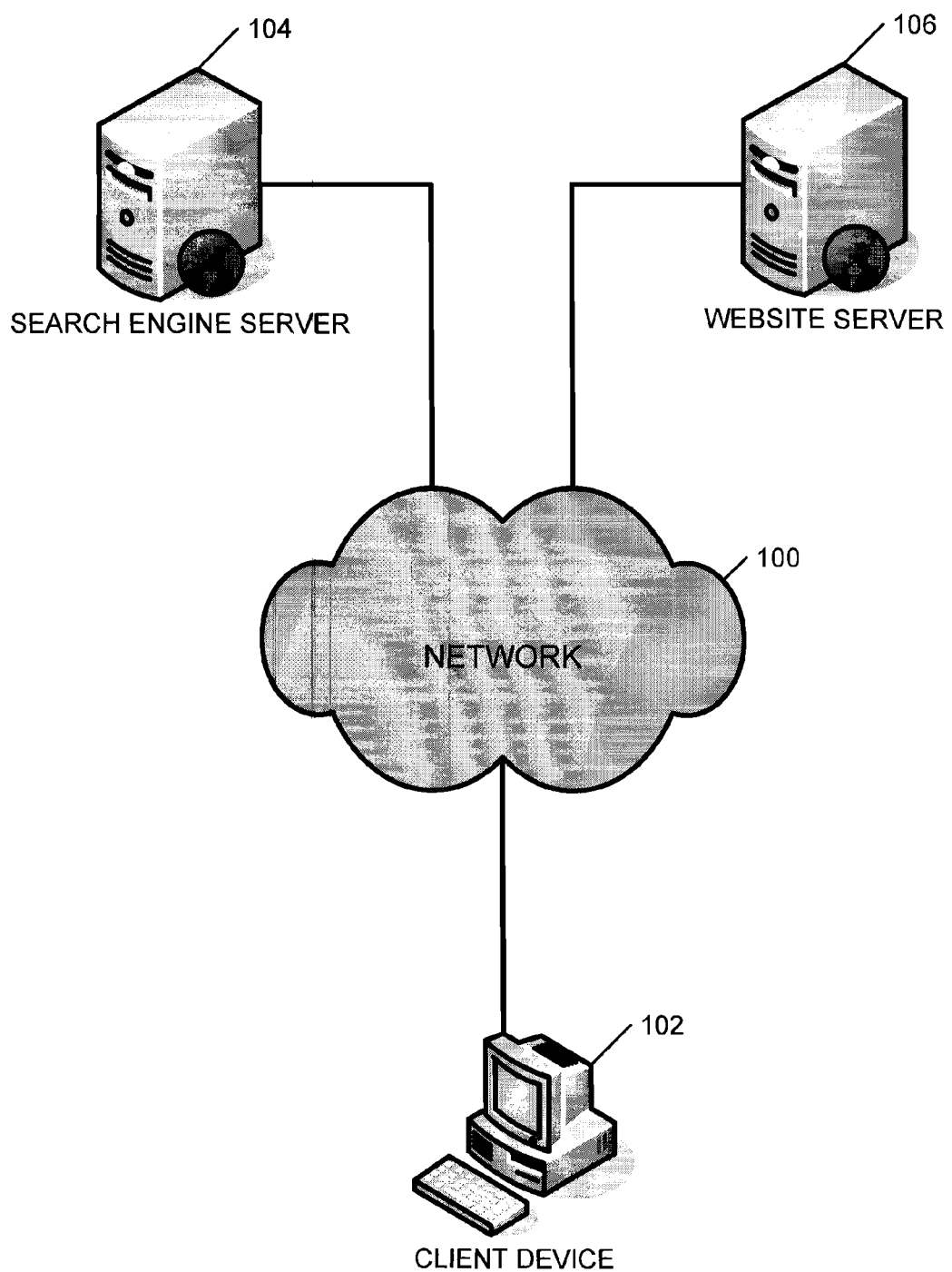
FIG. 1 is a network diagram illustrating exemplary components that may be implemented to provide a user with website data.

FIG. 1 is a network diagram illustrating exemplary components that may be implemented to provide a user with website data. More specifically, the configuration from FIG. 1 illustrates a client device 102 coupled to a network, such at the Internet 100. The Internet 100 may also be coupled to a search engine server 104, as well as a website server 106. In operation, the client device 102 can access the Internet 100, which can act as a portal for data provided by the search engine server 104. The search engine server 104 can provide data related to a web page that allows the user of a client device 102 to enter search criteria related to desired subject matter. The search engine server 104 can then search other web pages associated with the Internet 100, according to the received search criteria. Upon completing the search, the search engine server 104 can provide data (which may take the form of source code) that includes an address associated with at least one of the web pages revealed in the search. Upon receiving the data, a web browser (and/or other logic) associated with the client device 102 can determine a format for displaying the received information. The user can then select at least one of the addresses. Upon receiving the user selection, the search engine server 104 can redirect the client device 102 to the website server 106 associated with the selected address.

One should note that although a single server is illustrated for representing the search engine server 104, as one of ordinary skill on the art will understand, one or more servers, computers, etc. may be utilized to provide the desired functionality. Similarly, while the components of FIG. 1 are illustrated as having a wired connection to the Internet 100, this is also a nonlimiting example. In at least one embodiment one or more components may be wirelessly coupled to the Internet 100.

Additionally, one should also note that while the description above relates to an Internet configuration, this is a nonlimiting example. More specifically, the client device 102 may be configured to operate in an Intranet environment. Additionally, the website server 106 may be configured to provide searching and hierarchical taxonomy without utilization of a separate search engine server on both Internet and Intranet configurations.

Figure 2:
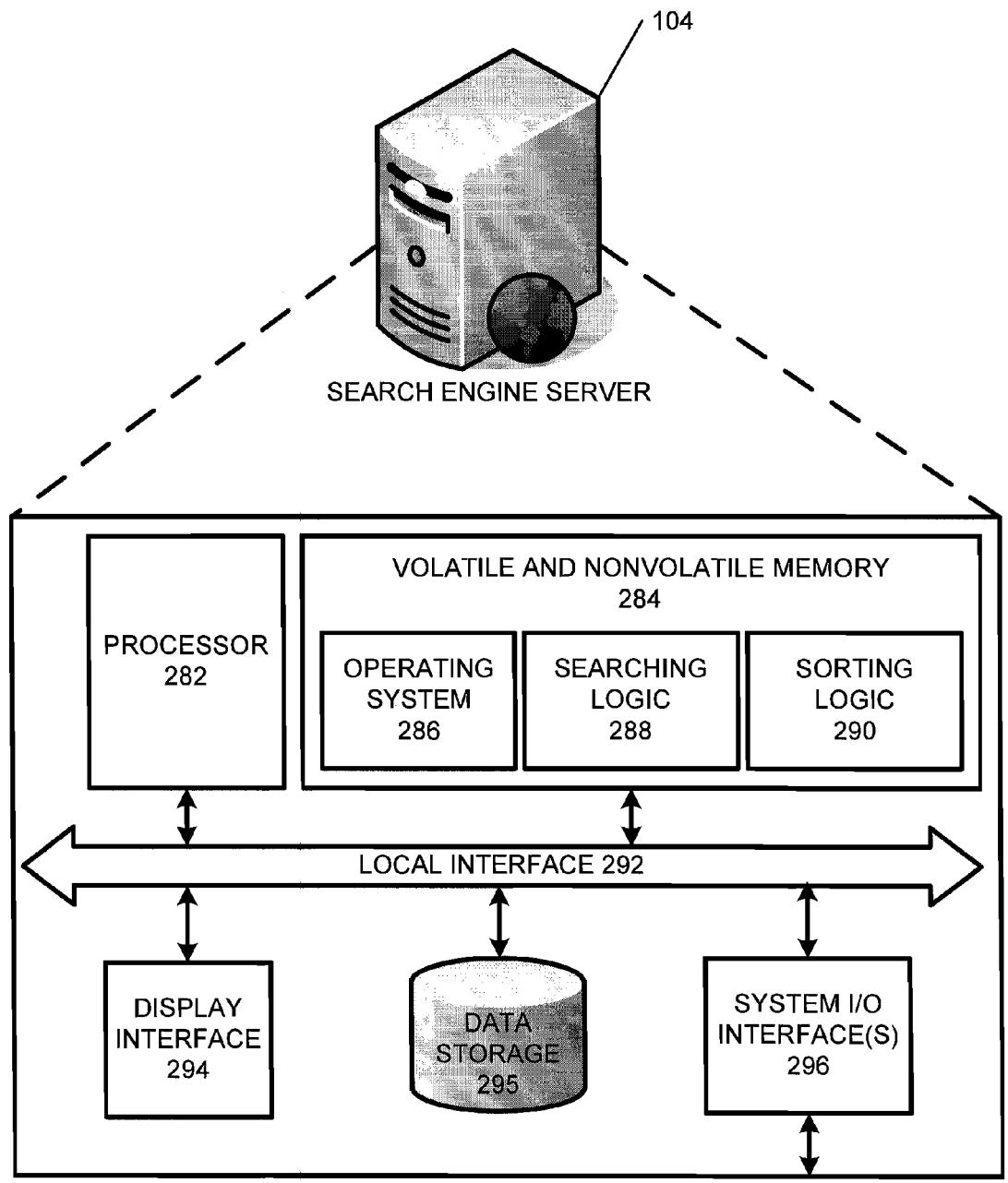
FIG. 2 is a block diagram illustrating exemplary components that may be associated with a computing device, such as the website and/or search engine server from FIG. 1.

FIG. 2 is a block diagram illustrating exemplary components that may be associated with a computing device, such as the website server 106 and/or the search engine server 104 from FIG. 1. Although a wire-line device is illustrated, this discussion can be applied to wireless devices, as well. Generally, in terms of hardware architecture, as shown in FIG. 2, the server 104 may include a processor 282, volatile and nonvolatile memory 284, a display interface 294, data storage 295, one or more input and/or output (I/O) device interface(s) 296, and/or one or more network interfaces that are communicatively coupled via a local interface 292. The local interface 292 can include, for example but not limited to, one or more buses or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in volatile and nonvolatile memory 284. The processor 282 can include any custom made or commercially available processor, a central processing unit (CPU), an auxiliary processor among several processors associated with the server 104, a semiconductor based microprocessor (in the form of a microchip or chip set), a macroprocessor, and/or generally any device for executing software instructions.

The volatile and nonvolatile memory 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the volatile and nonvolatile memory 284 can have a distributed architecture (where various components are situated remote from one another), but can be accessed by the processor 282. Additionally volatile and nonvolatile memory 284 can include searching logic 288, sorting logic 290, and an operating system 286.

The software in volatile and nonvolatile memory 284 may include one or more separate programs, each of which includes an ordered listing of executable instructions for implementing logical functions. In the example of FIG. 2, the software in the volatile and nonvolatile memory 284 may include searching logic, sorting logic, as well as operating system 286. The operating system 286 essentially controls the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 284, so as to operate properly in connection with the operating system 286.

The Input/Output devices that may be coupled to system I/O Interface(s) 296 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If server 104 includes a personal computer, workstation, or the like, the software in the volatile and nonvolatile memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the server 104 is activated.

When the server 104 is in operation, the processor 282 may be configured to execute software stored within the volatile and nonvolatile memory 284, to communicate data to and from the volatile and nonvolatile memory 284, and to generally control operations of the server 104 pursuant to the software. Software in memory, in whole or in part, may be read by the processor 282, perhaps buffered within the processor 282, and then executed.

One should note that while the description with respect to FIG. 2 includes a server 104 as a single component, this is a nonlimiting example. More specifically, in at least one embodiment, the server 104 can include a plurality of servers, personal computers, and/or other devices. Similarly, while the description of FIG. 2 describes the server 104, this is also a nonlimiting example, as other components may also be included in this description, such as a website server 106, client device 102 and/or other components.

Figure 3:
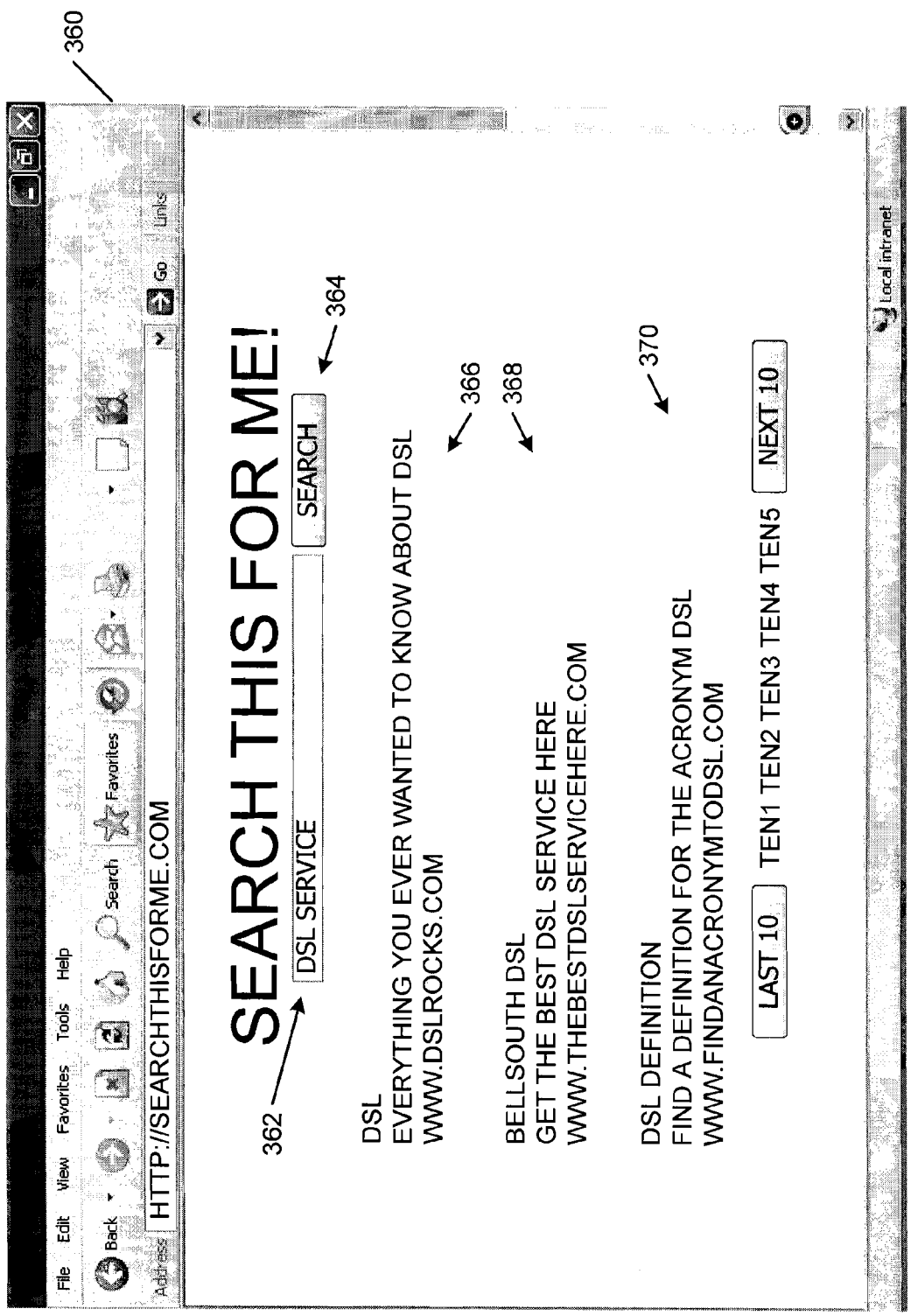
FIG. 3 is a nonlimiting example of a user interface illustrating searching capabilities that may be provided by the search engine server from FIG. 1.

FIG. 3 is a nonlimiting example of a user interface 360 illustrating searching capabilities that may be provided by the search engine server 104 from FIG. 1. The user interface 360 includes searching options for a user to locate data on one or more web pages. The user interface 360 includes a text prompt 362 and a search execution option 364 for initiating a search. More specifically, a user may input the desired search criteria in the text prompt 362 and select the search execution option 364. In response to receiving this data, a web browser component associated with client device 102 sends the search criteria to the search engine server 104 (and/or to the website server 106, depending on the configuration), which can compare the search criteria to data associated with one or more web pages on the Internet.

In response to locating one or more web pages associated with the search criteria, the search engine server 104 can return more search results 366, 368, 370 to the web browser associated with the user interface 360. The user may select one of the search results to access the desired information. As indicated above, while the search engine server 104 may provide a plurality of data related to a search criteria, in many configurations, this data may be unorganized and difficult for a user to determine relevancy to the search criteria.

Figure 4:
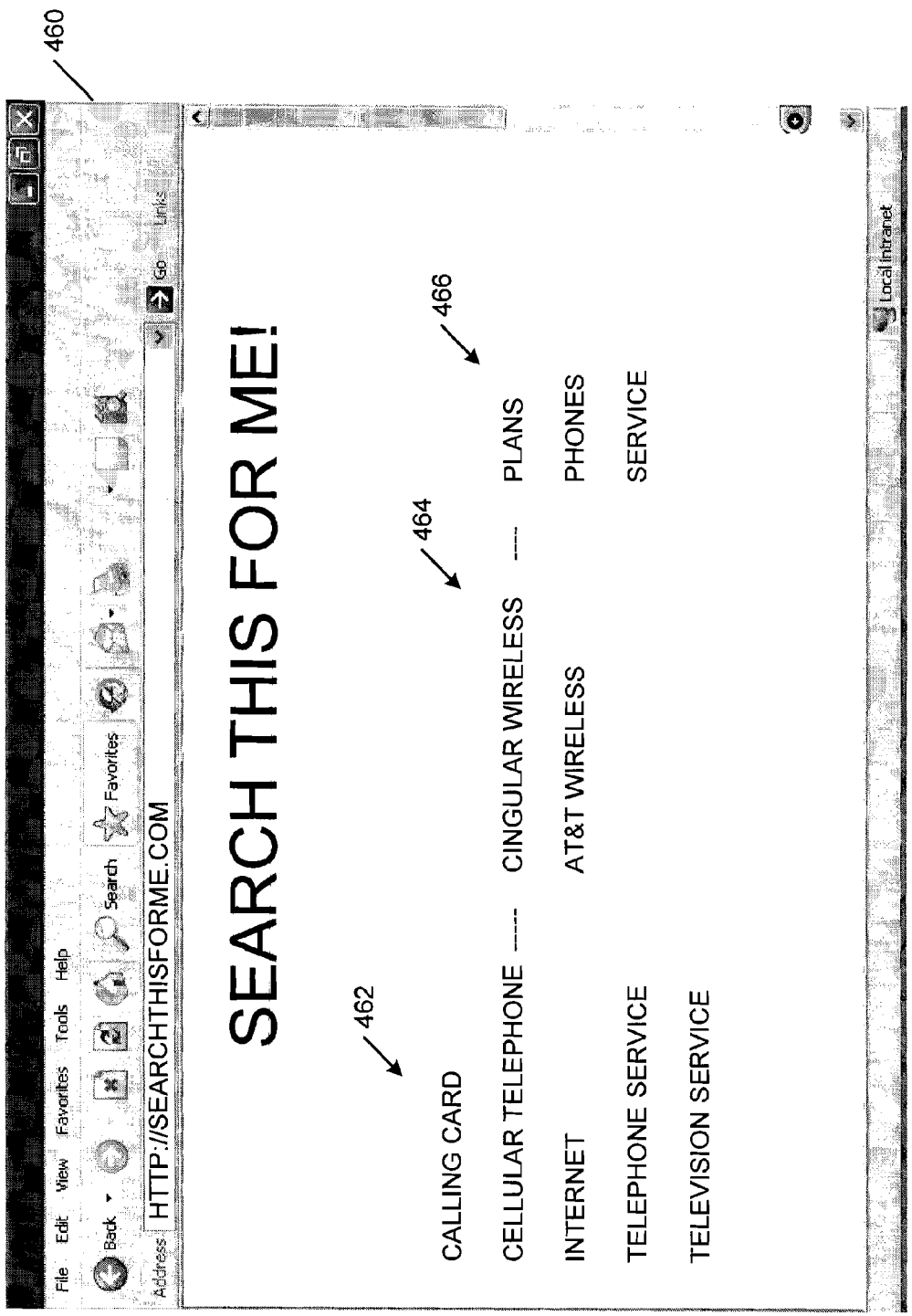
FIG. 4 is a nonlimiting example of a user interface that may be configured to provide a hierarchical searching structure similar to the user interface from FIG. 3.

FIG. 4 is a nonlimiting example of a user interface 406 that may be configured to provide a hierarchical searching structure similar to the user interface 360 from FIG. 3. As illustrated in the nonlimiting example of FIG. 4, the user interface 460 includes hierarchical searching techniques based on predetermined categories. As illustrated, the first level categories 462 include calling card, cellular telephone, Internet, telephone service, television service. A user can select any number of these categories to provide a listing of subcategories 464 for the select category 462. The subcategory 464 can include Cingular Wireless and AT&T Wireless. In response to a user's selection of Cingular Wireless, a second subcategory 466 is listed that includes plans, phones and service. Upon selecting from these second subcategory items, the user may be provided with the desired information.

As the nonlimiting examples of FIGS. 3 and 4 illustrate, these techniques for locating data on the Internet and/or Intranet are not without drawbacks. More specifically, with respect to the nonlimiting example of FIG. 3, oftentimes users are provided with a listing of web pages without indication of the actual relevancy of those web pages to search criteria. Similarly, the nonlimiting example of FIG. 4 includes a predetermined searching structure to which the user may be unfamiliar. As such, the user may not understand the organization of data and may thus have difficulty locating the desired data and/or web page.

FIG. 5A is a block diagram illustrating data that may be associated with a web page, such as a web page provided by the website server 106 from FIG. 1. As illustrated in the nonlimiting example of FIG. 5A, a web page 560a may be created with a plurality of criteria. As a nonlimiting example, a web developer may include within the code of the web page a title, keywords, a description, and/or other data. Similarly, the page 560a may be associated with a uniform resource locator (URL) for locating the web page. As illustrated in FIG. 5A, and according to exemplary embodiments, the web page 560a is entitled BellSouth—Phone Service, Direct TV, Cingular Wireless, DSL Internet. The keywords associated with the web page 560a, as determined by the web developer, include the terms "BellSouth," "Phone Service," "Cingular Wireless," "DirectTV Service," "DSL Internet," and "High Speed Internet." The description associated with the web page 560a includes, "Get local and long distance phone service, DSL Internet, Cingular Wireless, and DirectTV service from BellSouth." The URL associated with the web page 560a is www.bellsouthisforme.com.

As one of ordinary skill in the art would understand, the title, keywords, and/or description associated with the web page 560a may be included within HyperText Markup Language (HTML) associated with the web page 560a. However, according to some embodiments this data may include one or more meta-tags and/or metadata encoded in HTML, JavaScript, or other protocol.

Similarly, as illustrated in FIG. 5A and according to exemplary embodiments, a web page 560b is entitled "Local Phone Service, Calling Plans—BellSouth Dealers." The keywords associated with the web page 560b are "mobile phone service" and "calling plan." The description associated with the web page 560b includes "BellSouth Local Phone Services and Calling Plans offer flexibility, reliability, and value. Available in Alabama, Florida, Georgia, Kentucky, Louisiana, Mississippi, North Carolina, South Carolina, Tennessee." The URL associated with the web page 560b is www.bellsouthisforme.com/consumer/local.

Figure 5B:
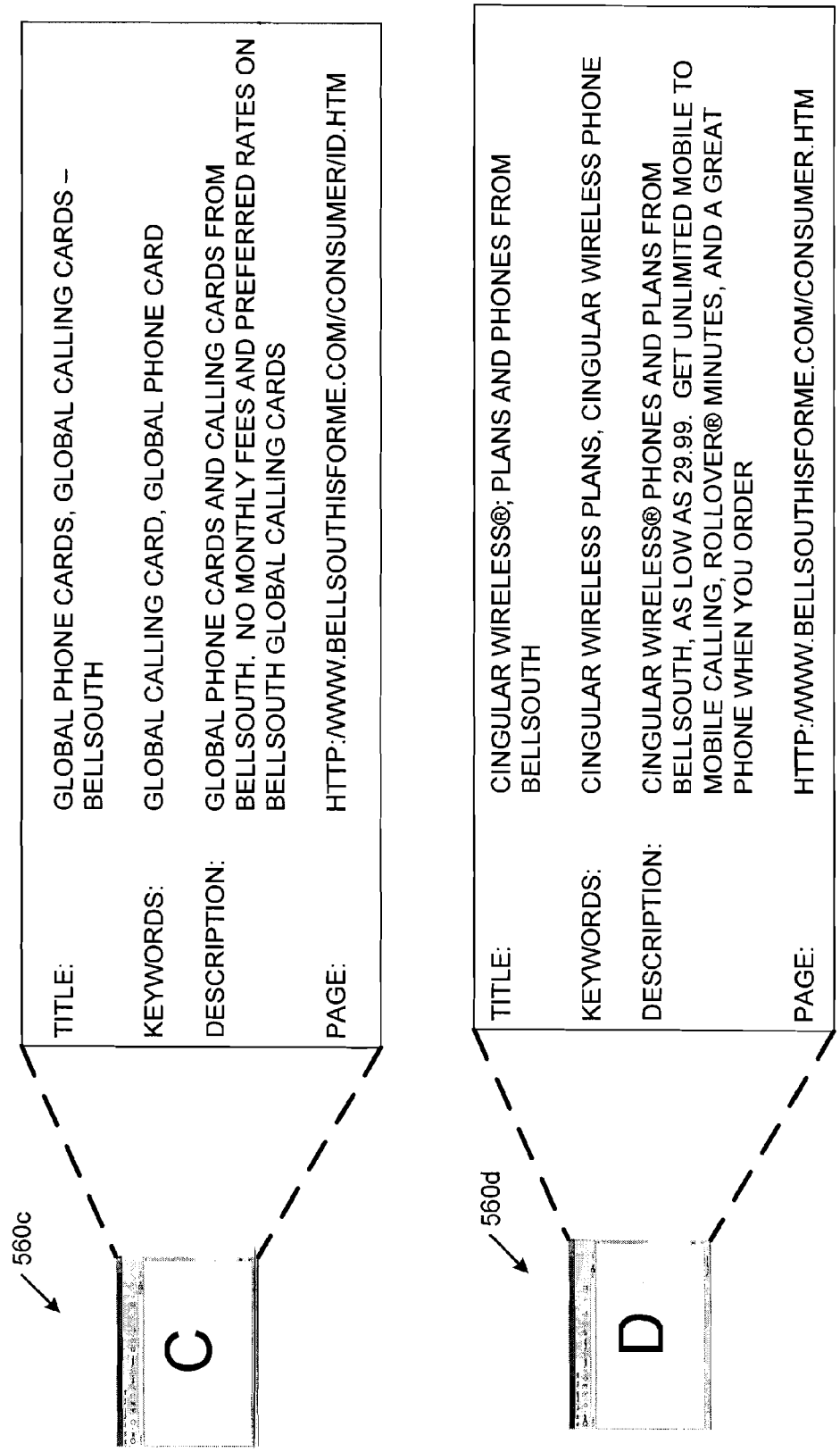
FIG. 5B is a continuation of the block diagram of FIG. 5A.

FIG. 5B is a continuation of the block diagram of FIG. 5A. According to exemplary embodiments, a web page 560c is entitled "Global Phone Cards, Global Calling Cards—BellSouth." Keywords associated with the web page 560c are global calling card and global phone card. The description associated with the web page 560c is "Global Phone Cards and Calling Cards from BellSouth. No monthly fees and preferred rates on BellSouth Calling Cards." The URL associated with the web page 560c is www.bellsouthisforme.com/consumer/id.htm.

According to embodiments, a web page 560d is entitled "Cingular Wireless®: Plans and Phones from BellSouth." The keywords associated with the web page 560d are "Cingular Wireless Plans" and "Cingular Wireless Phone." The description associated with the web page 560d includes "Cingular Wireless phones and plans from BellSouth as low as $29.99. Get unlimited mobile-to-mobile calling, Rollover® minutes, and a great phone when you order." The URL associated with the web page 560d is www.bellsouthisforme.com/consumer.htm.

One should note that while the web pages 560a, 560b, 560c, and 560d are associated with the website www.bellsouthisforme.com, this is a nonlimiting example. More specifically, the web pages 560a, 560b, 560c and 560d, in at least one embodiment, may be associated with an Intranet. In other embodiments, the web pages 560a, 560b, 560c and 560d may be unrelated other than being part of the Internet community, as a whole.

Figure 6:
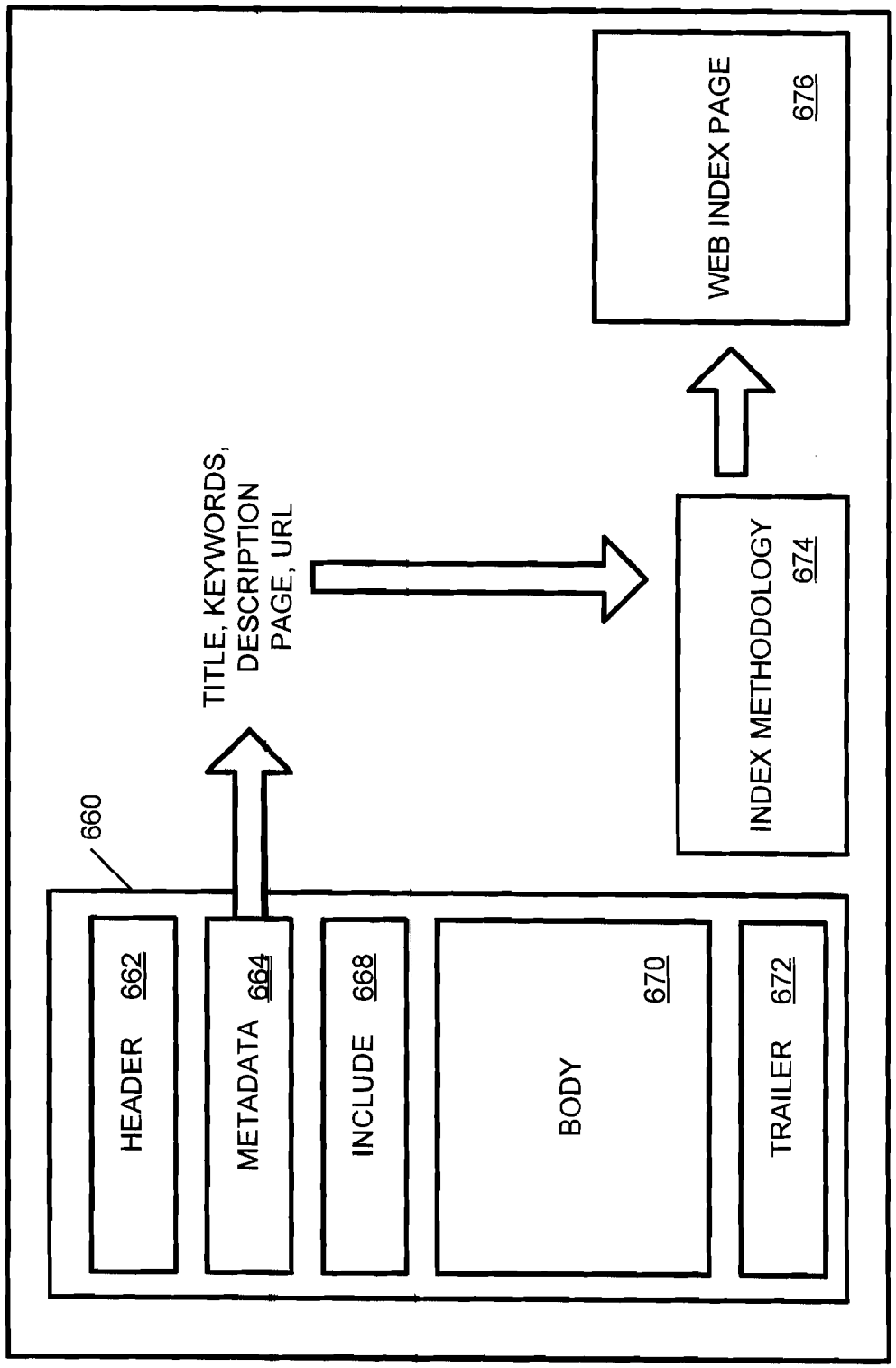
FIG. 6 is a block diagram illustrating a nonlimiting example of a web page utilizing index methodology similar to the web page from FIGS. 5A and 5B.

FIG. 6 is a block diagram illustrating a nonlimiting example of a web page utilizing an index methodology similar to the web pages 560a, 560b, 560c, and 560d from FIGS. 5A and 5B. As illustrated in the nonlimiting example of FIG.

6, a web page 660 can include one or more headers 662. The one or more headers 662 can be configured to define a web page's organizational structure and simplify navigation. According to embodiments, also included in the web page 660 is metadata 664. The metadata 664 can be configured to identify a web page title, a web page description, and/or keywords associated with the web page 660 and/or other data associated with the web page 660. The web page 660 may also include an include component 668. The include component 668 can be configured to include external references in source code associated with a web page. Developers may include style guides and/or external content. It is also possible to embed (include) a web page within another web page by utilizing this technique. Additionally, the include component 668 may be configured to provide an additional layer of metadata that can be indexed and/or provide contextual information.

Also included in the web page 660, according to embodiments, is a body portion 670. The body portion 670 of the web page 660 can include data that is displayed to a user, including text, pictures, videos, and/or other forms of data. The substance of the body portion 670 may be determined by a web developer, however, this is not a requirement. In at least one embodiment, a web page owner may change various aspects of the body portion 670 according to his or her desires. The web page 660 may also include a trailer portion 672. The trailer portion 672 can be configured to automatically insert an HTML formatted file at the bottom of the web page.

Depending on the particular configuration, the search engine server 104 and/or the web site server 106 can be configured to extract titles, keywords, description pages, URLs, and/or other data from the metadata component 664. The extracted data can be submitted to the index methodology 674 to provide the topic map as described in more detail below. More specifically, with respect to Intranet configurations, the web site server 106 can be configured to search one or more of the web pages associated with the Intranet and extract the desired data. The title, keywords, description, URLs, and/or other data can then be searched to determine the most common phrases and/or subject matter associated with the web pages. Once this data is compiled, topics may be created and/or associated with the determined web page data. The topics can then be organized such that one or more of the web pages can be listed as being associated with one or more of the topics. Once the organization of the topic map is complete, this data can be configured into a web index page 676.

Similarly, in an Internet configuration, the search engine server 104 can be configured to involve titles, keywords, description pages, URLs, and/or other data associated with a plurality of web pages. However, with the Internet configuration, problems may arise due to the inability of a search engine to determine the authenticity of the web page's search. The search engine server 104 may be configured to determine the authenticity of the web pages prior to configuring the web index page 676. As a nonlimiting example, the search engine server 104 may solicit various web sites to be included in the web page index 676. Other configurations can provide that the search engine server 104 compare the extracted title, keywords, description pages, URLs, or other data with data associated with the body 670 of the web page 660. This comparison can determine whether the web page includes data as indicated in the metadata 664. Similarly, the search engine server 104 can employ other techniques for determining the authenticity of received web pages.

As discussed above, the title, keywords, descriptions, and other information associated with web pages, such as the web pages 560*a*, 560*b*, 560*c*, and 560*d*, may include one or more metatags encoded in HTML, JavaScript, and/or other protocols. There is a plurality of basic types of metatags. One type of metatag includes "HTTP-EQUIV" tag that is used as a directive to the browser. The directive might include "en-us" to define the language as English and the United States. Metatags with an "HTTP-EQUIV" attribute may be similar to HTTP headers. Generally, these metatags control the action of web browsers, and may be used to refine the information provided by the actual headers. Tags using this form may have similar effect when specified as an HTTP header, and in some servers may be translated to actual HTTP headers automatically or by a pre-processing tool. A nonlimiting example of "HTTP-EQUIV" might look like the following code that tells the browser to refresh the HTML code from the server every 5 seconds.

<META HTTP-EQUIV="Refresh" CONTENT="5">

Some of the other most common "HTTP-EQUIV" tags include those illustrated in Table 1.

TABLE 1

HTTP-Equiv Tags

| Keyword | Example |
| --- | --- |
| content-language | Specifies the language |
| content-script-type | Defines scripting language used |
| content-style-type | Defines type of style sheets used |
| content-type | Specifies type of data within document |
| expires | Expiration date of the document. |
| ext-cache | Define Netscape external cache |
| imagetoolbar | This turns off Internet Explorer's image toolbar that appears when you hover over an image |
| page-enter | Specifies the transition effect that is to be performed when the page is loaded. |
| page-exit | Specifies the transition effect that is to be performed when the page is unloaded. |
| pics-label | Includes rating information so content filters can do their job |
| pragma | Do not locally cache documents |
| refresh | Indicates the document displays for a specified amount of time before switching to a new URL. |
| set-cookie | Sets the name and value for a persistent cookie. |
| site-enter | Specifies the transition effect that is to be performed when the site is loaded. |
| site-exit | Specifies the transition effect that is to be performed when the site is unloaded |
| window-target | Specifies the name of the frame for the current page |

Another type of metatag is the "NAME" tag. This tag provides a web developer with a mechanism for documenting the page. This metatag provides a robust collection of documentation keywords. Table 2 provides a sample of basic tags.

TABLE 2

Name Tags

| Keyword | Example |
| --- | --- |
| abstract | Define a secondary description. |
| author | Records the name of the author of the document. |
| classification | Classify the site into the appropriate category. |
| copyright | Used to include copyright information in the document. |
| description | Some search engines pick up this description to show with the results of searches. |
| distribution | Declares whether a document is available to the web or on an intranet. |
| doc-class | Indicates completion status of document. |
| doc-rights | Indicates copyright status of document. |
| doc-type | Specifies type of document. |

TABLE 2-continued

Name Tags

| Keyword | Example |
|---|---|
| expires | Expiration date of the document. |
| generator | The name of the program that created the document. |
| googlebot | Define pages to be excluded from googebot indexing. |
| keywords | Inform search engines what your web site or page is about. |
| MSSmartTagsPreventParsing | Use this tag to prevent any Microsoft product from automatically generating smart tags. |
| owner | Define the owner of the page or site. |
| progid | The Program Identifier for developing the web site |
| rating | A simple rating for a site. |
| refresh | Indicates the document displays for a specified amount of time before switching to a new URL. |
| reply-to | Email address of contact for document. |
| resource-type | Indicates the type of web resource. |
| revisit-after | Defines how often search engine spiders should revisit your site. |
| robots | Define pages to be excluded from robot indexing. |

An example of a name tag that identifies the editor of the HTML document as FrontPage might include the following.
<META NAME="Progid" CONTENT="FrontPage.Editor.Document">

Metatags can fall into any of a plurality of categories. Site tags may define characteristics for the entire site and may be found on pages with similar values. Page tags may be specific for each page being described. The key tags that will be used in this framework are the Title, Descriptions, Keywords and Page Link.

Referring back to FIGS. 5A and 5B, in which metadata associated with a plurality of web pages is displayed, the methodology can be illustrated. Based on metadata from the four web pages 560a, 560b, 560c, and 560d from FIGS. 5A and 5B, topics can be created from the base keywords. More specifically, web page 560a includes keywords "BellSouth," "phone service," "Cingular Wireless," "DirectTV Service," "DSL Internet," and "high speed Internet." This data, along with data from web pages 560b, 560c, and 560d can produce a list of topics. Once the list of topics has been produced, the title, description, and/or keywords associated with the web pages 560a, 560b, 560c, and 560d may be analyzed to determine if each of the web pages page fits into one or more of the topics. Potential topics associated with the web pages 560a-560d could include the following, as illustrated in Table 3.

TABLE 3

Categories and associated web pages

| Category | Web page |
|---|---|
| BellSouth | 560a, 560b, 560c, 560d |
| Phone Service | 560a, 560b |
| Cingular Wireless | 560a, 560d |
| DirectTV Service | 560a |
| DSL Internet | 560a |
| High Speed Internet | 560a |
| Local Phone Service | 560a, 560b |
| Calling Plan | 560b |
| Global Calling Card | 560c |
| Global Phone Card | 560c |
| Cingular Wireless Plans | 560d |
| Cingular Wireless Phone | 560d |

Figure 7:
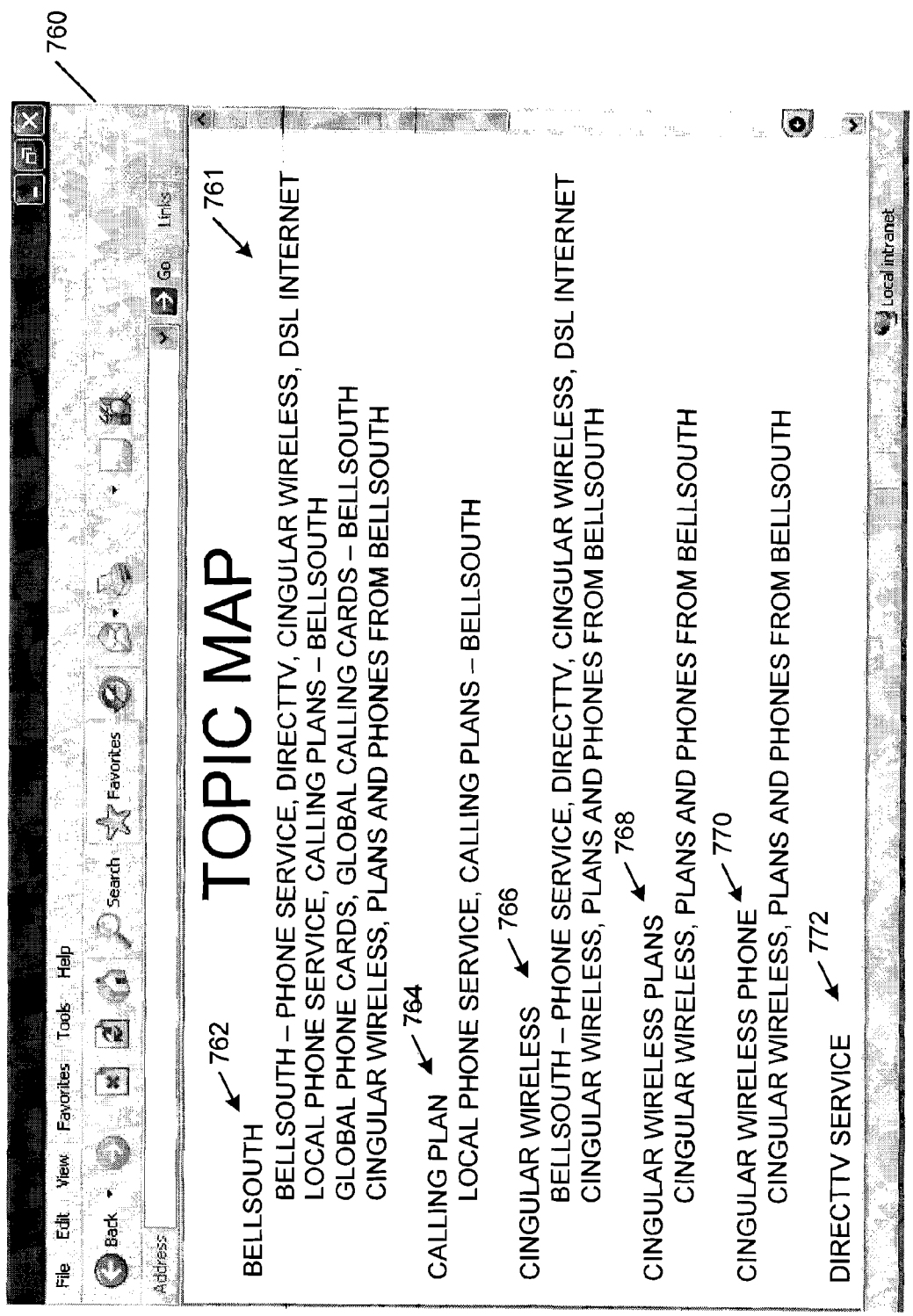
FIG. 7 is a nonlimiting example of a user interface that might be provided to a user in a topic map configuration similar to the user interface from FIG. 4.

FIG. 7 is a nonlimiting example of a user interface 760 that might be provided to a user in a topic map configuration similar to the user interface 460 from FIG. 4. As illustrated in the nonlimiting example of FIG. 7, the user interface 760 is configured to display a topic map 761. The topic map 761 may include one or more topics as derived from the metadata 664 from FIG. 6, and illustrated in Table 3. More specifically, topics can include BellSouth topic 762, Calling Plan topic 764, Cingular Wireless topic 766, Cingular Wireless Plan topic 768, Cingular Wireless Phone 770, and Direct TV Service 772. Associated with the BellSouth topic 762 are links to the web pages 560a, 560b, 560c, and 560d.

Similarly, the Calling Plan topic 764 is associated with the web page 560b, which is the same web page associated with the BellSouth topic 762. As a web page may be associated with one or more topics, the web page may be listed one or more times in the topic map 761 of the user interface 760.

Figure 8:
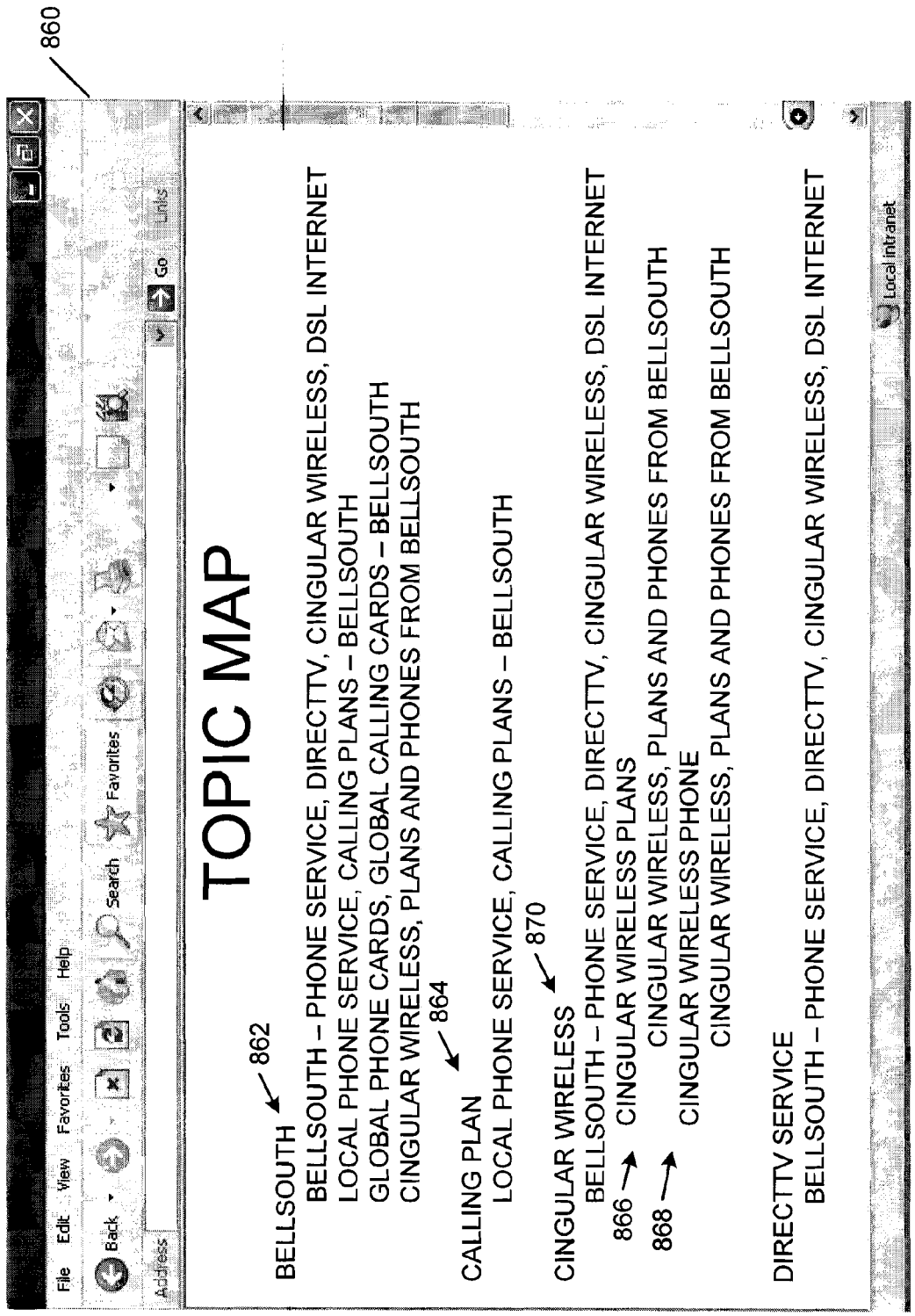
FIG. 8 is a nonlimiting example of a user interface that may be provided to a user for determining subtopics similar to the user interface from FIG. 7.

FIG. 8 is a nonlimiting example of a user interface 860 that may be provided to a user for providing subtopics similar to the user interface 760 from FIG. 7. As illustrated in the nonlimiting example of FIG. 8, the user interface 860 can include topics similar to those illustrated in the user interface 760. As a nonlimiting example, the BellSouth topic 862 is similar to the BellSouth topic 762 from FIG. 7. The BellSouth topic 862 can include a plurality of web pages associated with the BellSouth topic. However, the nonlimiting example of FIG. 8 illustrates that one or more of the topics in FIG. 7 may be consolidated to provide a more organized display for a user. More specifically, the Cingular Wireless topic 766, the Cingular Wireless Plan 768, and the Cingular Wireless Phone 770 can be consolidated into a subdivided Cingular Wireless topic 870.

Additionally, depending on the particular configuration, the consolidated topic may be further organized into subtopics to more clearly display the web sites. More specifically, as illustrated in the user interface 860, the subdivided Cingular Wireless topic 870 can be divided into a general category to which BellSouth—Phone Service, Direct TV, Cingular Wireless, DSL and Internet web page can be displayed. Additionally, a subtopic Cingular Wireless plans 866 and a Cingular Wireless Phone 868 can also include one or more web sites associated with these categories.

Figure 9:
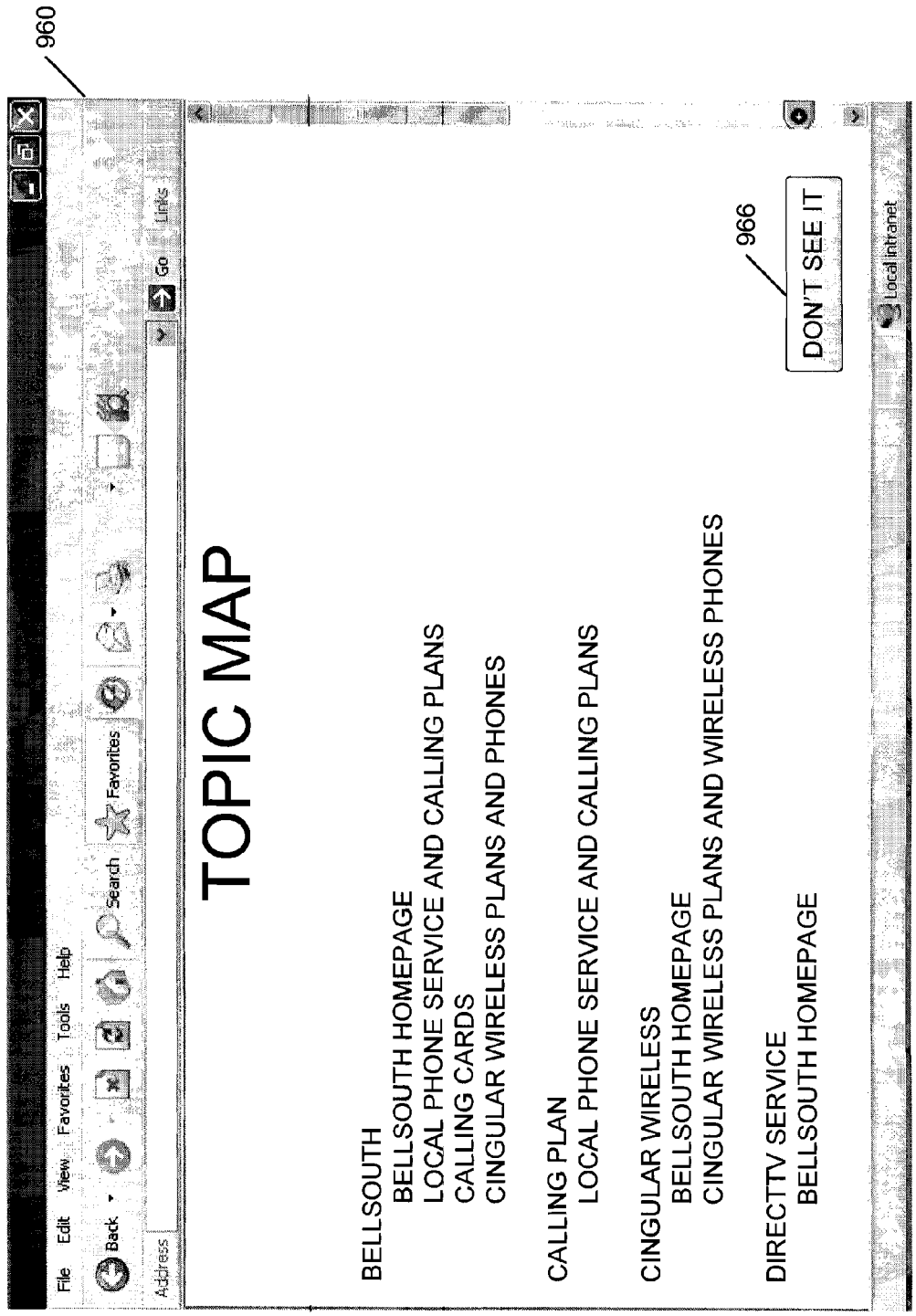
FIG. 9 is a nonlimiting example of a user interface that may be provided for utilizing information from web page titles, similar to the user interface from FIG. 8.

FIG. 9 is a nonlimiting example of a user interface 960 that may be provided for utilizing information from web page titles, similar to the user interface 860 from FIG. 8. As illustrated in the nonlimiting example of FIG. 9, the user interface 960 is configured to display the results from FIG. 8 in a more understandable manner. More specifically, the web site server 106 and/or the search engine server 104 may be configured to determine from the above-described metadata a more user friendly and/or user understandable title (e.g., display name) for each of the web pages listed. Additionally included in the nonlimiting example of FIG. 9 is a "Don't See It" option 966. The Don't See It option 966 can be configured to provide a user with the ability to find a web page that otherwise is not listed in the topic map. As a nonlimiting example, upon selecting the Don't See It option 966, a user may be provided with a user interface similar to the user interface 360 and/or 460 to more easily form the desired data and/or web page. Similarly, other configurations for finding a desired web page may be provided as well.

One difference between FIG. 8 and FIG. 9 is the reduction of information. Reducing the amount of information provided to a user can be beneficial in making a user interface less complex and more usable. By utilizing pattern recognition and/or artificial intelligence, applications can review large scale information maps and reduce the complexity. Technically, this can be accomplished by utilizing synonyms, homonyms, and other grammar tools. As a nonlimiting example, suppose three links are related to "SOA." The first link is entitled "Service Oriented Architecture Frameworks." The second link is entitled "SOA Frameworks." The third link is entitled "SOA Models."

Since SOA is an abbreviation of "Service Oriented Architecture," then the first link and the second link are the same. Based on the fact that frameworks and models are synonyms (or at least closely related), The third link can be grouped with the second link. Hence, all three links are the same and removing two of the links does not reduce the value of content, but does lower the number of choices provided to the user.

Additionally, some embodiments may be configured to include web pages with different spellings of the same subject matter in the same topic. More specifically, referring back to FIGS. 5A and 5B, if web page 560*a* includes "DirectTV" and the web page 560*d* includes "Direct TV," the server 104, 106 may be configured to determine that these are similar and/or equivalent and include both web pages under the same topic.

One should also note that a web page may include data that changes. As such, the server 104, 106 may be configured to rebuild the topic map on a continuous, periodic, aperiodic and/or other basis. Depending on the change in subject matter, a topic map may also change.

Figure 10:
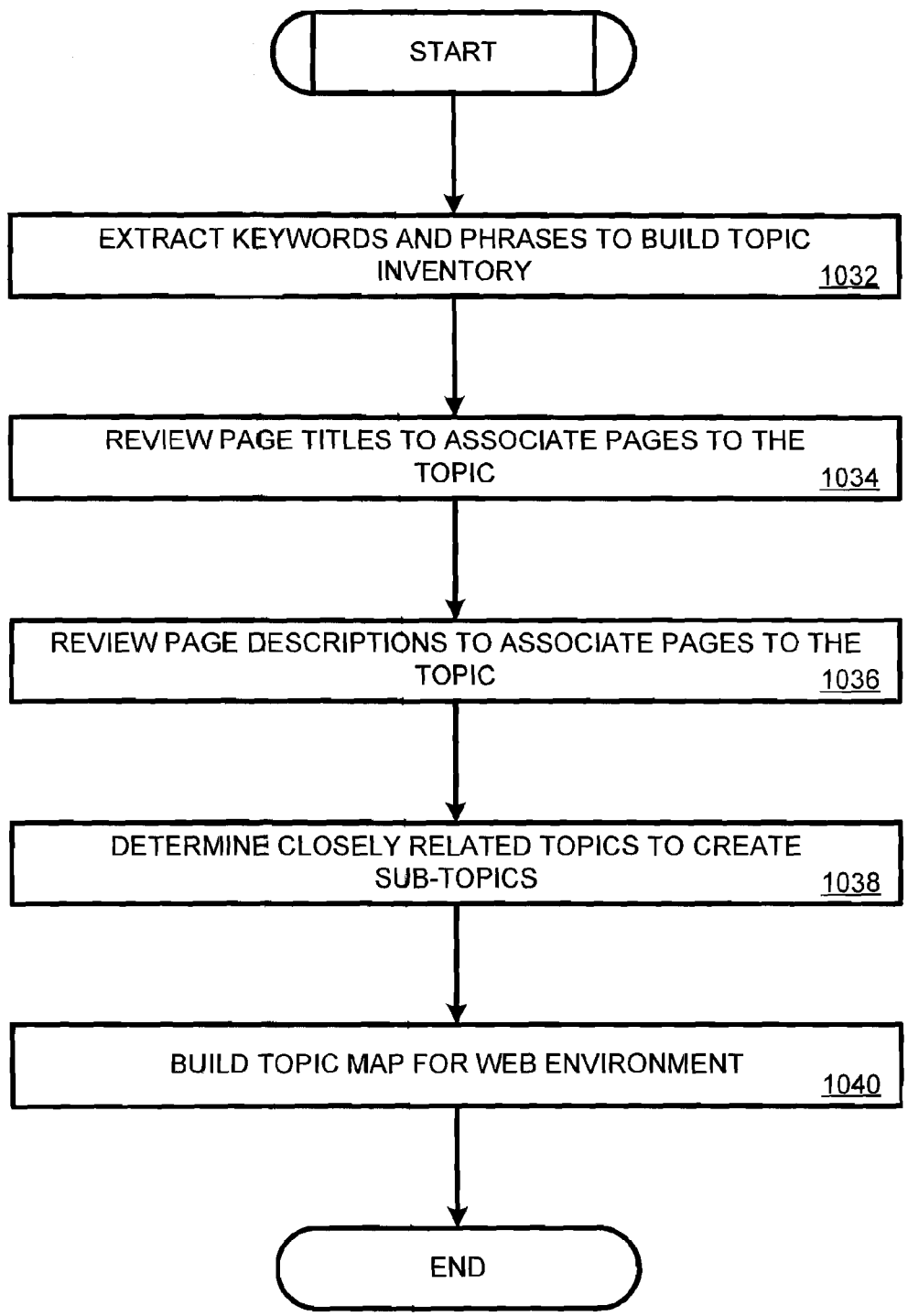
FIG. 10 is a flowchart illustrating an exemplary process that may be utilized for providing a topic map similar to the topic map from FIG. 9.

FIG. 10 is a flowchart illustrating an exemplary process that may be utilized for providing a topic map similar to topic map from FIG. 9. As illustrated in the nonlimiting example of FIG. 10, the web site server 106 and/or search engine server 104 may be configured to extract words and/or phrases from one or more web pages to build an inventory of topics associated with the web pages (block 1032). More specifically, as discussed above, a plurality of web pages may be searched and metadata may be extracted to determine keywords, phrases, title, descriptions, URLs and/or other data associated with the received web pages. Once the metadata is extracted, the server 104, 106 can review web page titles to associate the web pages with one or more of the topics from the topic inventory (block 1034). The server 104, 106 can then review web page descriptions to associate the web pages with one or more of the topics (block 1036). The server 104, 106 can determine related topics for the creation of subtopics (block 1038). This determination can be made based on keyword searching and/or other logic. The server 104, 106 can then build a topic map for a web environment (block 1040).

Figure 11:
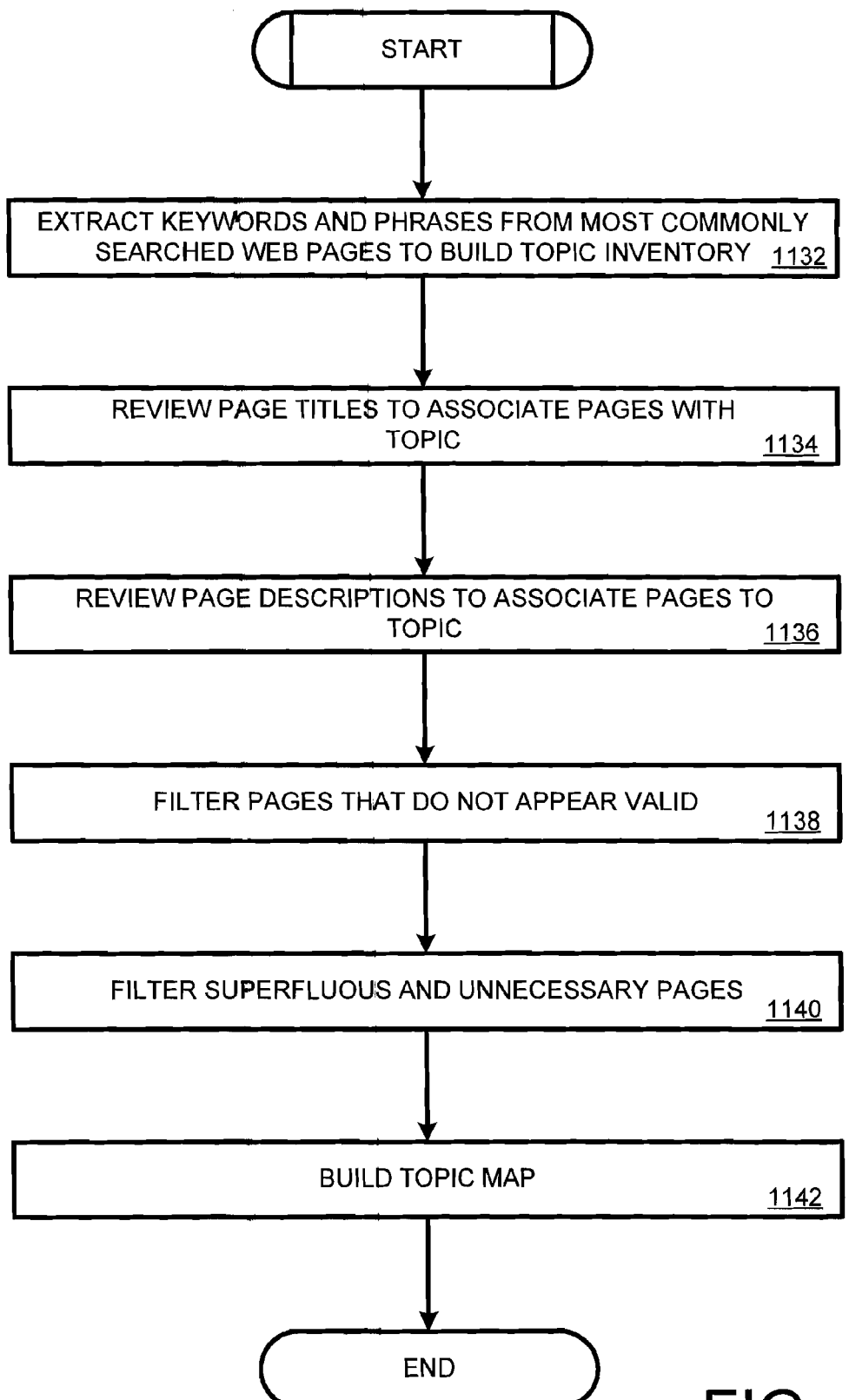
FIG. 11 is a flowchart illustrating an exemplary process that may be utilized for providing a topic map in an Internet environment similar to the flowchart from FIG. 10.

FIG. 11 is a flowchart illustrating an exemplary process that may be utilized for providing a topic map in an Internet environment similar to flowchart from FIG. 10. As illustrated in the nonlimiting example of FIG. 11, the search engine server 104 and or web site server 106 can be configured to extract words and/or phrases from the most commonly searched web pages to build an inventory of topics (block 1132). More specifically, the server 104, 106 can be configured to determine the most commonly searched web pages. Determining the most commonly searched web pages can provide the search engine server 104 with a pool of web pages by which to create the topic inventory. Similarly, as discussed above, the server 104, 106 can implement one or more authentication techniques to adequately determine if the web pages in the topic inventory are authentic according to their metadata. The server 104, 106 can then review web page titles to associate the wen pages with one or more of the topics from the topic inventory (block 1134). The server 104, 106 can then review web page descriptions to associate the web pages to one or more topics from the topic inventory (block 1136). The server 104, 106 can then filter pages that do not appear valid (block 1138). More specifically, to determine whether a web page is valid, metadata may be extracted from a header of the web page and then compared with data extracted from a body of the web page. If the search engine server 104 determines that web page metadata is not correlated to data in the body of the web page, the server 104, 106 can remove this web page and/or all pages associated with this web page from the topic inventory.

The server 104, 106 can then filter superfluous and unnecessary pages from the topic inventory (block 1140). More specifically, the search engine server 104 can determine as numerous results as can be present in the topic inventory. The server 104, 106 may reduce this number in any number of different ways. As a nonlimiting example, the server 104, 106 can compare metadata of various pages to determine if the pages provide substantially similar information. Similarly, other embodiments can be configured to compare web page data to determine whether the pages are superfluous (e.g., a web page is duplicated, subject matter is duplicated, etc.). Still other embodiments can be configured to determine, based on user actions, which web pages are unnecessary in the topic map. Once the superfluous and unnecessary pages are filtered, the search engine server 104 can build a topic map (block 1142).

Figure 12A:
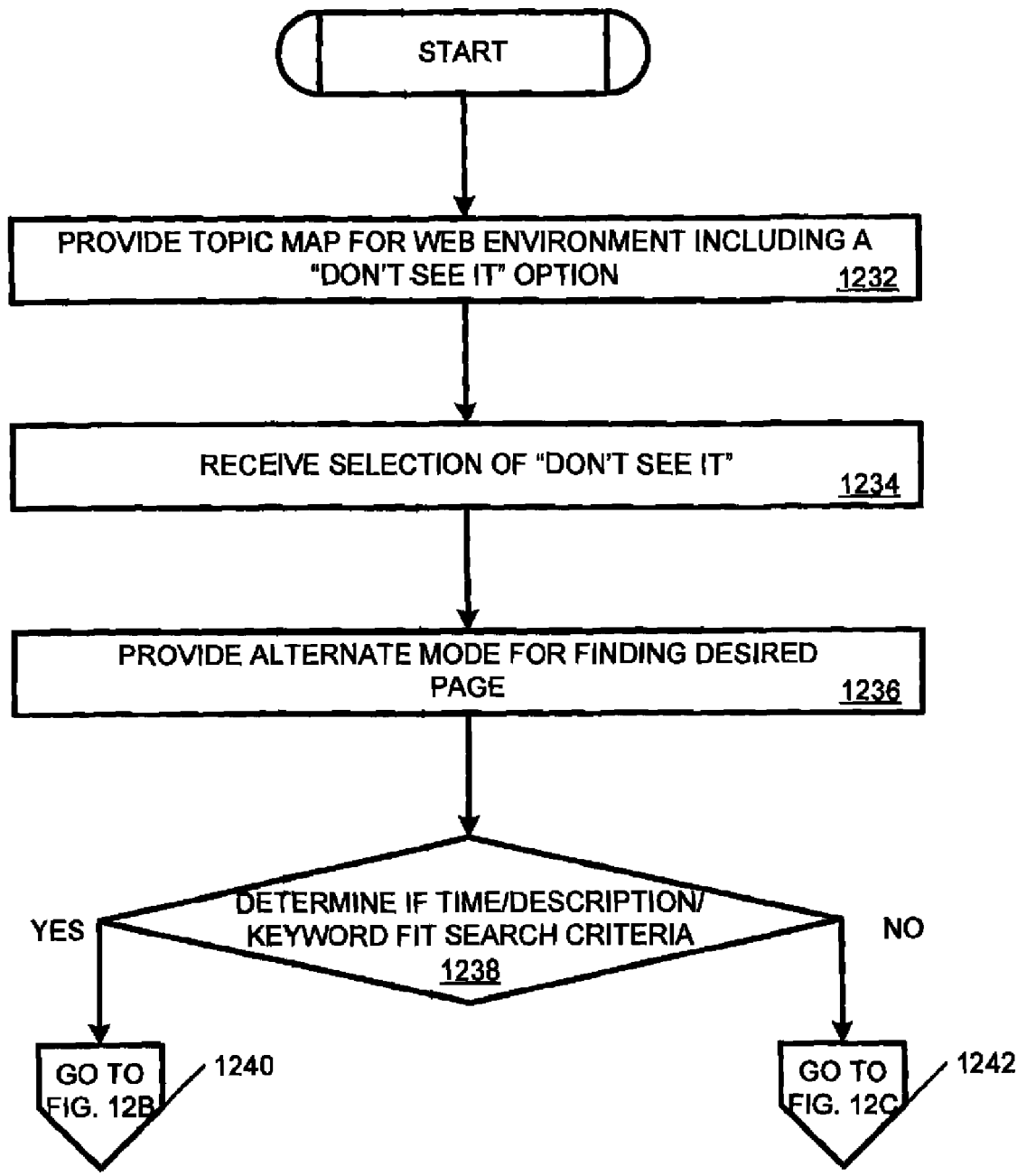
FIG. 12A is a flowchart illustrating an exemplary process that may be utilized for amending the topic map from FIG. 9.

FIG. 12A is a flowchart illustrating an exemplary process that may be utilized for amending a topic map, such as the topic map from FIG. 9. As illustrated in the nonlimiting example of FIG. 12A, the search engine server 104 and/or web site server 106 can be configured to provide a topic map for a web environment including a Don't See It option (block 1232). The server 104, 106 can then receive a user selection of the Don't See It option (block 1234). The server 104, 106 can then provide an alternate mode for finding a desired page (block 1236). Once the desired page is located, the server 104, 106 can determine if the metadata including title data, description, and/or keyword data fit the search criteria as input by the user (block 1238). If the metadata does fit the search criteria, the flowchart proceeds to jump block 1240, continued in FIG. 12B.

Figure 12B:
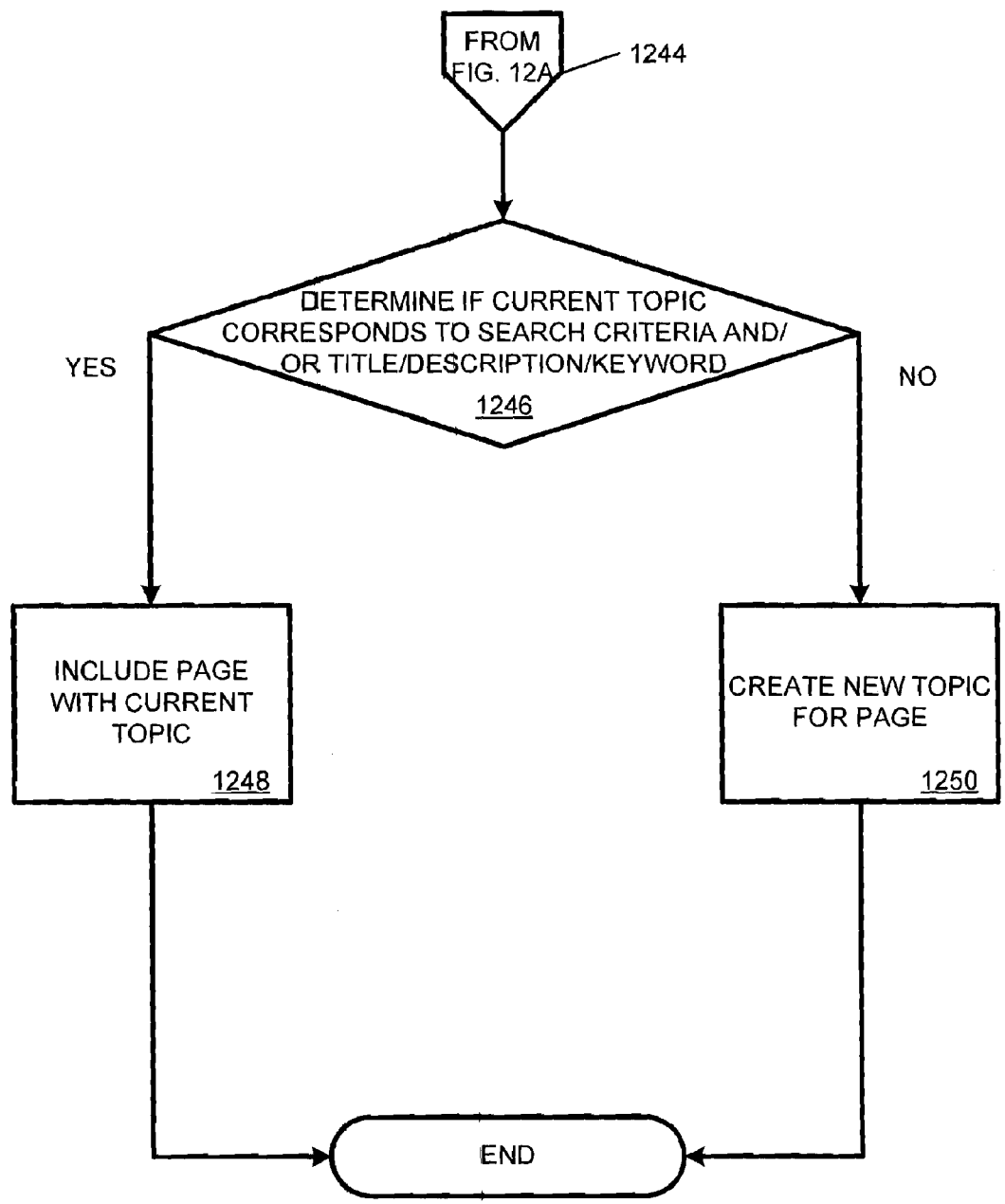
FIG. 12B is a continuation of the flowchart from FIG. 12A.

FIG. 12B is a continuation of the flowchart from FIG. 12A. As illustrated in the nonlimiting example of FIG. 12B, from the jump block 1244, the flowchart proceeds to determine whether a current topic corresponds to a search criteria and/or the metadata (e.g., title, description, keyword, other data), as illustrated in block 1246. If a current topic does correspond to the search criteria and/or metadata, the server 104, 106 can include this page with that current topic (block 1248). If the current topic does not correspond to the search criteria and/or metadata, a new topic can be created for this page (block 1250).

Figure 12C:
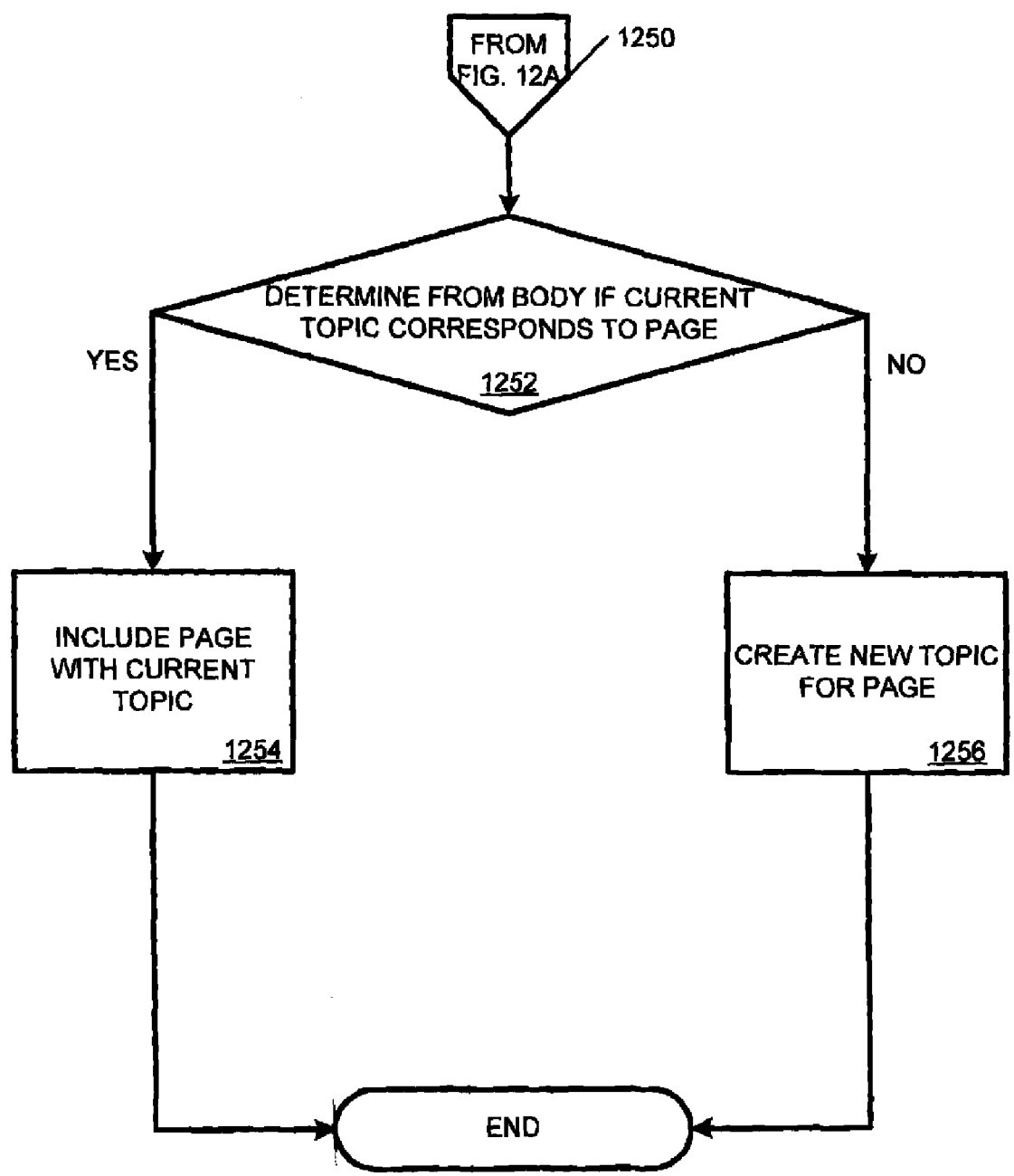
FIG. 12C is a continuation of the flowchart from FIG. 12A.

If from block 1238 of FIG. 12A, a determination is made that the metadata does not fit the search criteria, the flowchart proceeds to jump block 1242, which is continued on FIG. 12C. FIG. 12C is a continuation of the flowchart from FIG. 12A. As illustrated in the nonlimiting example of FIG. 12C, from jump block 1242, the flowchart proceeds to determine from the body of the web page whether a current topic corresponds to the web page (block 1252). If a current topic does correspond to the web page, the server 104, 106 can include the web page with the current topic (block 1254). If a current topic does not correspond to the web page, the server 104, 106 can include a new topic for a web page (block 1256).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for providing a topic map, comprising:
   receiving a first web page and a second web page, the first web page and the second web page including metadata, the first web page and the second web page being part of a website and organized hierarchically under a uniform resource locator address for the website;
   extracting at least a portion of the metadata from the first web page and the second web page;
   determining, by a computing device, a first topic that is common to content in the first web page and the second web page, the first topic being derived from the metadata;
   determining whether the first web page and the second web page are similar;
   in response to determining that the first web page and the second web page are not similar, providing the topic map for the website, the topic map including the first topic and the topic map listing the first web page and the second web page as corresponding to the first topic; and
   in response to determining that the first web page and the second web page are similar, providing the topic map for the website, the topic map including the first topic, the topic map listing the first web page as corresponding to the first topic, while excluding the second web page,
   wherein the topic map provides a listing of topics of content associated with the website and corresponding links to web pages of the website where particular topics of content are located in the website.

2. The method of claim 1, wherein the topic map includes at least one link to at least one of the first web page and the second web page.

3. The method of claim 1, wherein the metadata includes at least one of the following: a web page title, a web page description, and a web page keyword.

4. The method of claim 1, further comprising determining a sub-topic associated with the first topic.

5. The method of claim 1, further comprising, in response to excluding the second web page, providing an option to view the second web page.

6. The method of claim 1, further comprising determining a display name for at least one web page of the website, the display name being determined from at least a portion of the metadata.

7. The method of claim 1, further comprising providing the topic as a result to a website search.

8. The method of claim 1, the topic map including a no desired result option, the no desired result option for providing search capabilities to the user, in response to a determination that the topic map does not include a desired result.

9. A system for providing a topic map, comprising:
   a memory that stores at least the following:
      a receiving component configured to receive a first web page and a second web page, the first web page and the second web page including metadata, the first web page and the second web page being part of a website and organized hierarchically under a uniform resource locator address for the website;
      an extracting component configured to extract at least a portion of the metadata from the first web page and the second web page;
      a first determining component configured to determine a first topic that is common to content in the first web page and the second web page, the first topic being derived from the metadata;

a second determining component configured to determine whether the first web page and the second web page are similar;

a first creating component configured to, in response to determining that the first web page and the second web page are not similar, create the topic map for the website, the topic map including the first topic that is common to the first web page and the second web page, the topic map listing the first web page and the second web page as corresponding to the first topic; and a second creating component configured to, in response to determining that the first web page and the second web page are similar, create the topic map for the website, the topic map listing the first web page as corresponding to the first topic, while excluding the second web page, wherein the topic map provides a listing of topics of content associated with the website and corresponding links to web pages of the website where particular topics of content are located in the website.

10. The system of claim 9, the memory further storing providing component configured to provide the topic map, the topic map including the first topic.

11. The system of claim 10, wherein the topic map includes a link to at least one of the first web page and the second web page.

12. The system of claim 9, wherein the metadata includes at least one of the following: a web page title, a web page description, and a web page keyword.

13. The system of claim 9, the memory further storing a determining component configured to determine a sub-topic associated with the first topic.

14. The system of claim 9, the memory further storing an option providing component configured to, in response to excluding the second web page, provide an option to view the second web page.

15. The system of claim 9, the memory further storing a display name determining component configured to determine a display name for a web page of the website, the display name being determined from the at least a portion of the metadata.

16. A non-transitory computer readable medium that stores a program for providing a topic map, that, when executed by a computer, causes the computer to perform at least the following:

receive a first web page and a second web page, the first web page and the second web page including metadata, the first web page and the second web page being part of a website and organized hierarchically under a uniform resource locator address for the website;

extract at least a portion of the metadata from the first web page and the second web page;

determine a first topic that is common to content of the first web page and the second web page, the first topic being derived from the metadata;

determine whether the first web page and the second web page are similar;

in response to determining that the first web page and the second web page are not similar, provide the topic map for the website, the topic map including the first topic and the topic map listing the first web page and the second web page as corresponding to the first topic; and in response to determining that the first web page and the second web page are similar, provide the topic map for the website, the topic map including the first topic, the topic map listing the first web page as corresponding to the first topic, while excluding the second web page, wherein the topic map provides a listing of topics of content associated with the website and corresponding links to web pages of the website where particular topics of content are located in the website.

17. The non-transitory computer readable medium of claim 16, wherein the topic map includes a link to at least one of the first web page and the second web page.

18. The non-transitory computer readable medium of claim 16, wherein the metadata includes at least one of the following: a web page title, a web page description, and a web page keyword.

19. The non-transitory computer readable medium of claim 16, the program further causing the computer to perform at least the following:

determine a sub-topic associated with the first topic.

* * * * *